United States Patent
Thompson

(10) Patent No.: US 8,925,541 B2
(45) Date of Patent: Jan. 6, 2015

(54) METHOD AND SYSTEM FOR CONTROLLING AN INDUCER IN A MODULATING FURNACE

(75) Inventor: Kevin D. Thompson, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 639 days.

(21) Appl. No.: 13/252,286

(22) Filed: Oct. 4, 2011

(65) Prior Publication Data

US 2012/0080023 A1 Apr. 5, 2012

Related U.S. Application Data

(60) Provisional application No. 61/389,868, filed on Oct. 5, 2010.

(51) Int. Cl.

| | |
|---|---|
| *F24H 3/00* | (2006.01) |
| *F24H 9/20* | (2006.01) |
| *F24H 8/00* | (2006.01) |
| *F23N 1/10* | (2006.01) |

(52) U.S. Cl.
CPC .............. *F24H 9/2085* (2013.01); *F24H 8/00* (2013.01); *F23N 1/102* (2013.01); *F24D 2200/046* (2013.01); *Y02B 30/108* (2013.01); *Y02B 30/102* (2013.01)
USPC .. 126/99 R; 126/110 A; 126/112; 126/116 A; 431/12

(58) Field of Classification Search
CPC .............. F23L 17/005; F24F 11/0079; F24F 2011/0041

USPC .......... 126/99 R, 110 A, 112, 116 A; 431/12; 236/10, 15 C, 15 R
See application file for complete search history.

(56) References Cited

U.S. PATENT DOCUMENTS

| | | | |
|---|---|---|---|
| 4,648,551 A | | 3/1987 | Thompson et al. |
| 4,688,547 A | | 8/1987 | Ballard et al. |
| 4,887,767 A | * | 12/1989 | Thompson et al. ......... 236/1 EB |
| 5,492,273 A | * | 2/1996 | Shah ........................... 236/44 A |
| 5,559,407 A | | 9/1996 | Dudley et al. |
| 5,616,995 A | * | 4/1997 | Hollenbeck ................... 318/432 |
| 5,676,069 A | * | 10/1997 | Hollenbeck ................... 110/147 |
| 5,680,021 A | * | 10/1997 | Hollenbeck ................... 318/432 |
| 5,682,826 A | * | 11/1997 | Hollenbeck ................... 110/147 |
| 5,806,440 A | * | 9/1998 | Rowlette et al. .............. 110/162 |
| 6,226,324 B1 | * | 5/2001 | Allstrom ....................... 375/238 |
| 6,321,744 B1 | | 11/2001 | Dempsey et al. |
| 7,101,172 B2 | * | 9/2006 | Jaeschke ......................... 431/19 |
| 7,431,568 B2 | * | 10/2008 | Brown et al. ................. 417/44.1 |
| 7,695,273 B2 | | 4/2010 | Dempsey |
| 7,735,743 B2 | * | 6/2010 | Jaeschke ......................... 236/11 |
| 8,672,670 B2 | * | 3/2014 | Hugghins ......................... 431/2 |
| 2007/0287111 A1 | * | 12/2007 | Stone et al. .................... 431/18 |
| 2008/0127962 A1 | | 6/2008 | Thompson |
| 2008/0127963 A1 | | 6/2008 | Thompson |
| 2009/0044794 A1 | * | 2/2009 | Hugghins et al. ......... 126/116 A |

\* cited by examiner

*Primary Examiner* — Jorge Pereiro
(74) *Attorney, Agent, or Firm* — Cantor Colburn LLP

(57) ABSTRACT

A furnace includes an induced draft blower; an inducer motor driving the induced draft blower; and a furnace control determining a modulation percentage, the furnace control controlling RPM of the inducer motor in response to the modulation percentage.

12 Claims, 3 Drawing Sheets

METHOD AND SYSTEM FOR CONTROLLING AN INDUCER IN A MODULATING FURNACE

CROSS-REFERENCE TO RELATED APPLICATIONS

This application is a non-provisional application of U.S. Provisional Patent Application No. 61/389,868 filed Oct. 5, 2010, the entire contents of which are incorporated herein by reference.

BACKGROUND OF THE INVENTION

The subject matter disclosed herein generally relates to modulating furnaces, and in particular to a method and system for controlling an inducer in a modulating furnace.

Modulating furnaces operate through ranges of combustion airflow and gas rate in order to efficiently meet heat demand. Existing modulating furnaces run between 40% and 100% of total capacity based on heat demand and other variables. One challenge in operating a modulating furnace over a range of heating capacities is control of the inducer. The inducer draws air through the heat exchanger and sends the air out a vent. It is desirable to provide a smooth transition of inducer speed over a range of operating capacities without requiring additional components, such as pressure transducers.

BRIEF DESCRIPTION OF THE INVENTION

An embodiment is a furnace including an induced draft blower; an inducer motor driving the induced draft blower; and a furnace control determining a modulation percentage, the furnace control controlling RPM of the inducer motor in response to the modulation percentage.

Another embodiment is a method of controlling a furnace having an inducer motor, the method including determining a modulation percentage; and controlling RPM of the inducer motor in response to the modulation percentage.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
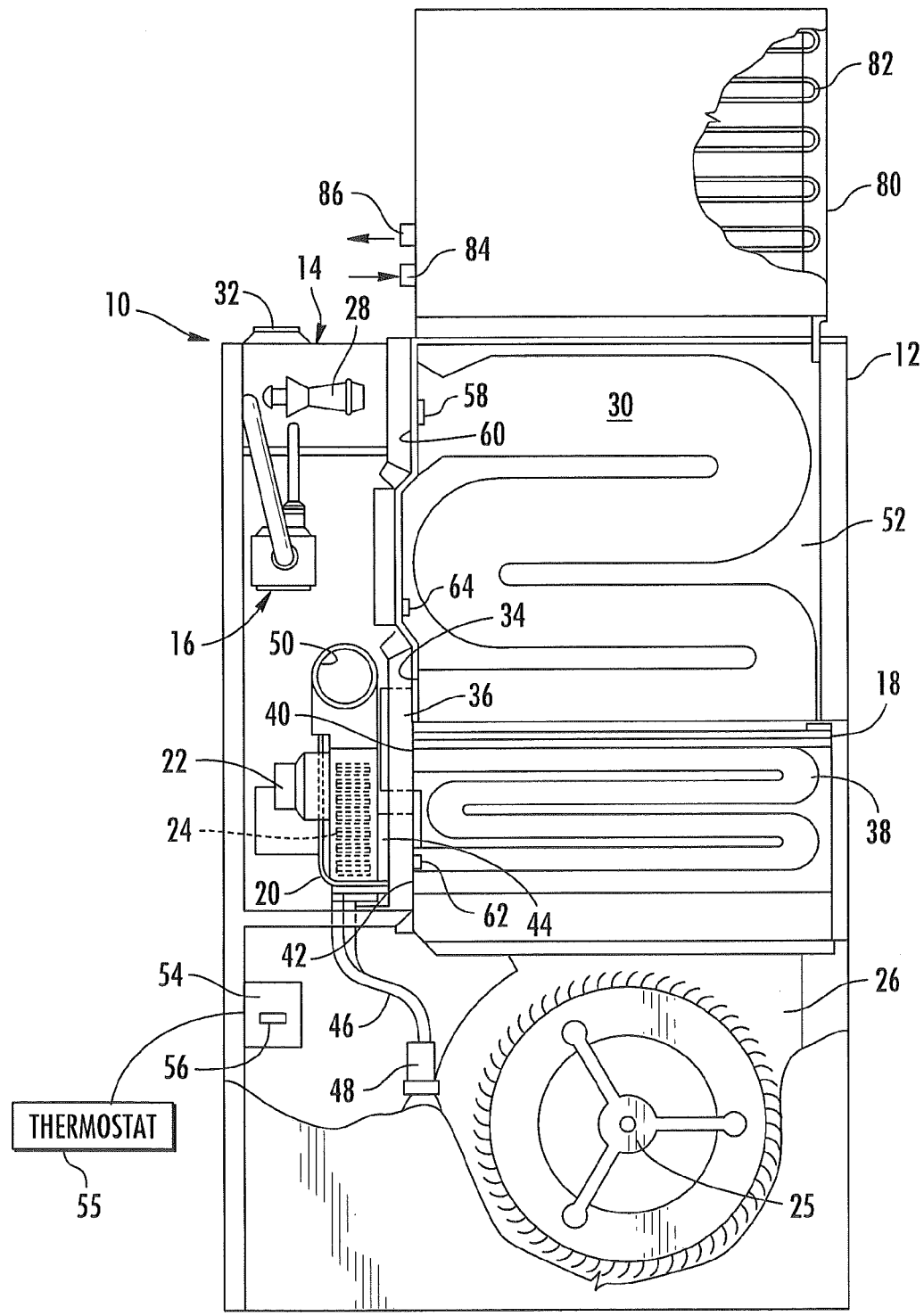
FIG. 1 depicts an exemplary furnace having an evaporator coil.

FIG. 1, the numeral 10 generally designates a gas-fired condensing furnace employing the blower motor control of the present invention. Condensing furnace 10 includes a steel cabinet 12 housing therein burner assembly 14, combination gas control 16, heat exchanger assembly 18, inducer housing 20 supporting, inducer motor 22 and inducer wheel 24, and circulating air blower 26. Combination gas control 16 includes a hot surface igniter (not shown) to ignite the fuel gas.

Burner assembly 14 includes at least one inshot burner 28 for at least one primary heat exchanger 30. Burner 28 receives a flow of combustible gas from gas regulator 16 and injects the fuel gas into primary heat exchanger 30. A part of the injection process includes drawing air into heat exchanger assembly 18 so that the fuel gas and air mixture may be combusted therein. A flow of combustion air is delivered through combustion air inlet 32 to be mixed with the gas delivered to burner assembly 14.

Primary heat exchanger 30 includes an outlet 34 opening into chamber 36. Connected to chamber 36 and in fluid communication therewith are at least four condensing heat exchangers 38 having an inlet 40 and an outlet 42. Outlet 42 opens into chamber 44 for venting exhaust flue gases and condensate.

Inducer housing 20 is connected to chamber 44 and has mounted thereon an inducer motor 22 together with inducer wheel 24 for drawing the combusted fuel air mixture from burner assembly 14 through heat exchanger assembly 18. Air blower 26 is driven by blower motor 25 and delivers air to be heated in a counterflow arrangement upwardly through air passage 52 and over heat exchanger assembly 18. The cool air passing over condensing heat exchanger 38 lowers the heat exchanger wall temperature below the dew point of the combusted fuel air mixture causing a portion of the water vapor in the combusted fuel air mixture to condense, thereby recovering a portion of the sensible and latent heat energy. The condensate formed within heat exchanger 38 flows through chamber 44 into drain tube 46 to condensate trap assembly 48. As air blower 26 continues to urge a flow of air, upwardly through heat exchanger assembly 18, heat energy is transferred from the combusted fuel air mixture flowing through heat exchangers 30 and 38 to heat the air circulated by blower 26. Finally, the combusted fuel air mixture that flows through heat exchangers 30 and 38 exits through outlet 42 and is then delivered by inducer motor 22 through exhaust gas outlet 50 and thence to a vent pipe (not illustrated).

Cabinet 12 also houses a controller 54 and a display 56. Controller 54 may be implemented using a microprocessor-based controller executing computer program code stored on a computer readable storage medium. A thermostat 55 communicates with controller 54 to designate operational modes and temperature. Thermostat 55 may be an intelligent device that communicates requested air flow rates as described in further detail herein. A pressure tap 58 is located at primary heat exchanger inlet 60, a pressure tap 62 is located at condensing heat exchanger outlet 42 and a limit switch 64 is disposed in air passage 52. In a non-condensing furnace, pressure tap 62 would be disposed at primary heat exchanger outlet 34, since there would be no condensing heat exchanger 38. To provide additional control, a pressure switch assembly (not shown) including low pressure switch, medium pressure switch, and high pressure switch may be coupled to pressure tap 58 and pressure tap 62 and in communication with controller 54.

For cooling modes, a cooling coil 82 is located in housing 80 on top of furnace cabinet 10 and is the evaporator of air conditioning system. The cooling coil 82 has an inlet 84, where subcooled refrigerant enters, and an outlet 86, where superheated refrigerant leaves, as is conventional. In response to an input from heating/cooling thermostat, air blower 26 urges air flow upwardly through cooling coil 82 where heat exchange takes place. As a result of this heat exchange, cool air is delivered to the conditioned space and superheated refrigerant is returned to the outdoor condensing section (not illustrated) via outlet 86. In the outdoor condensing section the refrigerant is subcooled and returned to inlet 84. This cycle continues until the thermostat is satisfied.

In exemplary embodiments, the furnace of FIG. 1 is operated through five ranges of heating capacity, referred to herein as low, low-medium, medium, medium-high and high. In certain ranges, the inducer motor is controlled as a function of the operating capacity and an RPM value. The operating capacity is referred to herein as the modulation percentage, with 100% representing full capacity.

Figure 2:
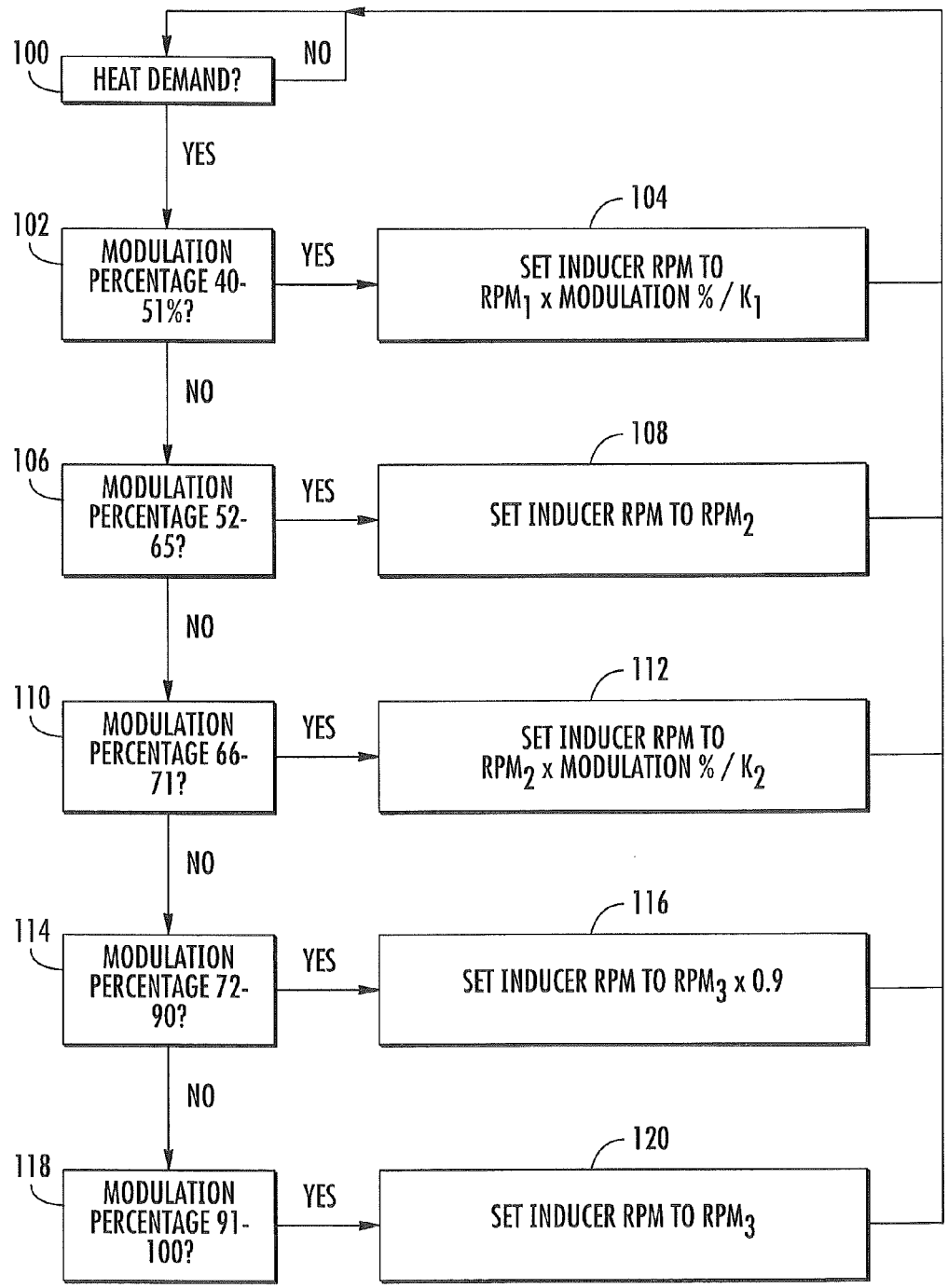
FIG. 2 is a flowchart of a control process.

FIG. 2 is a flowchart of an exemplary process for controlling the inducer motor 32. The process is implemented by furnace control 54. The process begins at 100 where it is determined if a heat demand signal is received from thermostat 34. If not, the process cycles waiting for a heat demand signal.

Once a heat demand signal is received, flow proceeds to 102 where a determination is made whether the modulation percentage is 40% to 51%, which may be referred to as low range. The modulation percentage may be computed by furnace control 54 based on preloaded routines and prior heating patterns. Alternatively, the thermostat 34 may be an intelligent device and provide the desired modulation percentage to furnace control 54. If so, flow proceeds to 104 where the furnace control 54 sets the inducer motor rpm to value of $RPM_1 \times Modulation \%/K_1$. $RPM_1$ is a first RPM value and may be based on a reference RPM, $RPM_{REF}$, such as the inducer motor RPM when the medium pressure sensor is tripped before ignition when the inducer begins circulating air through the heat exchanger. $RPM_1$ may be mathematically derived from $RPM_{REF}$. $K_1$ is a constant and may be a reference modulation percentage, such as 40%.

If the modulation percentage is not 40% to 51%, flow proceeds to 106 where a determination is made whether the modulation percentage is 52% to 65%, which may be referred to as low-medium range. If so, flow proceeds to 108 where the furnace control 54 sets the inducer motor rpm to value of $RPM_2$. $RPM_2$ is a second RPM value and may be based on the reference RPM, $RPM_{REF}$, such as the inducer motor RPM when the medium pressure sensor is tripped before ignition when the inducer begins circulating air through the heat exchanger. $RPM_2$ may be mathematically derived from $RPM_{REF}$. $RPM_2$ is different than, and greater than, $RPM_1$.

If the modulation percentage is not 52% to 65%, flow proceeds to 110, where a determination is made whether the modulation percentage is 66% to 71%, which may be referred to as medium range. If so, flow proceeds to 112 where the furnace control 54 sets the inducer motor rpm to value of $RPM_2 \times Modulation \%/K_2$. $K_2$ is a constant and may be a reference modulation percentage, such as 65%.

If the modulation percentage is not 66% to 71%, flow proceeds to 114, where a determination is made whether the modulation percentage is 72% to 90%, which may be referred to as medium-high range. If so, flow proceeds to 116 where the furnace control 54 sets the inducer motor rpm to value of $RPM_3 \times K_3$. $K_3$ is a constant and may be 0.9. $RPM_3$ is a third RPM value and may be based on the reference RPM, $RPM_{REF}$, such as the inducer motor RPM when the medium pressure sensor is tripped before ignition when the inducer begins circulating air through the heat exchanger. $RPM_3$ may be mathematically derived from $RPM_{REF}$. $RPM_3$ is different than, and greater than, $RPM_1$ and $RPM_2$.

If the modulation percentage is not 72% to 90%, flow proceeds to 118, where a determination is made whether the modulation percentage is 91% to 100%, which may be referred to as high range. If so, flow proceeds to 118 where the furnace control 54 sets the inducer motor rpm to value of $RPM_3$.

Figure 3:
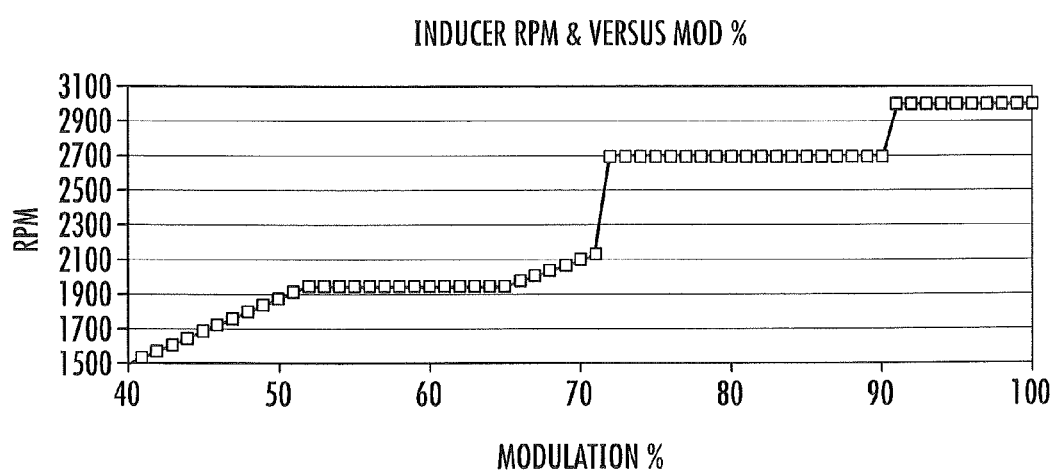
FIG. 3 is a plot of inducer RPM versus modulation percentage in exemplary embodiments.

FIG. 3 is a plot of inducer RPM versus modulation percentage in embodiments of the invention. The values in FIG. 3 correspond to the numerical values provided in FIG. 2. It is understood that other numerical values may be used, and embodiments are not limited to the values described herein. Further, the number of ranges and the modulation percentages defining each range may be varied. Embodiments provide control of inducer motor RPM in over the range of heating capacities without drastic steps in the inducer motor RPM.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. The A furnace comprising:
an induced draft blower;
an inducer motor driving the induced draft blower; and
a furnace control determining a modulation percentage, the furnace control controlling RPM of the inducer motor in response to the modulation percentage;
wherein in a first range, the furnace control controls the inducer motor RPM based on the equation:

$$\text{inducer motor RPM} = RPM_1 \times MODULATION \%/K_1$$

where $RPM_1$ is a value derived from a reference RPM, MODULATION % is the current modulation percentage and $K_1$ is a reference modulation percentage.

2. The furnace of claim 1 wherein:
the reference RPM is the inducer motor RPM when a medium pressure sensor is tripped before ignition.

3. The furnace of claim 1 wherein:
in a second range, the furnace control controls the inducer motor RPM based on the equation:

$$\text{inducer motor RPM} = RPM_2$$

where $RPM_2$ is a value derived from the reference RPM.

4. The furnace of claim 3 wherein:
in a third range, the furnace control controls the inducer motor RPM based on the equation:

$$\text{inducer motor RPM} = RPM_2 \times MODULATION \%/K_2$$

where $RPM_2$ is a value derived from the reference RPM, MODULATION % is the current modulation percentage and $K_2$ is a reference modulation percentage, $RPM_2$ being different than $RPM_1$ and $K_2$ being different from $K_1$.

5. The furnace of claim 4 wherein:
in a fourth range, the furnace control controls the inducer motor RPM based on the equation:

$$\text{inducer motor RPM} = RPM_3 \times K_3$$

where $RPM_3$ is a value derived from the reference RPM and $K_3$ is a constant.

6. The furnace of claim 5 wherein:
in a fifth range, the furnace control controls the inducer motor RPM based on the equation:

$$\text{inducer motor RPM} = RPM_3.$$

7. A method of controlling a furnace having an inducer motor, the method comprising:
   determining a modulation percentage; and
   controlling RPM of the inducer motor in response to the modulation percentage;
   wherein in a first range, the furnace control controls the inducer motor RPM based on the equation:

inducer motor RPM=$RPM_1 \times$MODULATION %/$K_1$ where $RPM_1$ is a value derived from a reference RPM, MODULATION % is the current modulation percentage and $K_1$ is a reference modulation percentage.

8. The method of claim 7 wherein:
   the reference RPM is the inducer motor RPM when a medium pressure sensor is tripped before ignition.

9. The method of claim 7 wherein:
   in a second range, the furnace control controls the inducer motor RPM based on the equation:

inducer motor RPM=$RPM_2$ where $RPM_2$ is a value derived from the reference RPM.

10. The method of claim 9 wherein:
    in a third range, the furnace control controls the inducer motor RPM based on the equation:

inducer motor RPM=$RPM_2 \times$MODULATION %/$K_2$ where $RPM_2$ is a value derived from the reference RPM, MODULATION % is the current modulation percentage and $K_2$ is a reference modulation percentage, $RPM_2$ being different than $RPM_1$ and $K_2$ being different from K.

11. The method of claim 10 wherein:
    in a fourth range, the furnace control controls the inducer motor RPM based on the equation:

inducer motor RPM=$RPM_3 \times K_3$ where $RPM_3$ is a value derived from the reference RPM and $K_3$ is a constant.

12. The method of claim 11 wherein:
    in a fifth range, the furnace control controls the inducer motor RPM based on the equation:

INDUCER MOTOR RPM=$RPM_3$.

* * * * *